(12) United States Patent
Chang

(10) Patent No.: US 9,083,781 B2
(45) Date of Patent: Jul. 14, 2015

(54) PORTABLE IMAGE-CAPTURING DEVICE WITH EMBEDDED PROJECTOR

(75) Inventor: Kuo-Ching Chang, New Taipei (TW)

(73) Assignee: Bascule Development AG LLC, Wilmington, DE (US)

( * ) Notice: Subject to any disclaimer, the term of this patent is extended or adjusted under 35 U.S.C. 154(b) by 683 days.

(21) Appl. No.: 13/152,621

(22) Filed: Jun. 3, 2011

(65) Prior Publication Data
US 2011/0242392 A1 Oct. 6, 2011

Related U.S. Application Data

(63) Continuation-in-part of application No. 12/954,687, filed on Nov. 26, 2010, now Pat. No. 8,127,995, which is a continuation of application No. 11/783,551, filed on Apr. 10, 2007, now Pat. No. 7,874,486, which is a
(Continued)

(30) Foreign Application Priority Data

Dec. 22, 2010 (TW) ............................... 99145405 A

(51) Int. Cl.
 G02F 1/1335 (2006.01)
 H04M 1/02 (2006.01)
(Continued)

(52) U.S. Cl.
 CPC ........ *H04M 1/0272* (2013.01); *H04M 1/72522* (2013.01); *H04N 1/00283* (2013.01); *H04N 7/183* (2013.01); *H04N 9/3105* (2013.01); *H04N 9/3111* (2013.01); *H04N 9/3164* (2013.01);
(Continued)

(58) Field of Classification Search
 USPC .......................................................... 349/5–9
 See application file for complete search history.

(56) References Cited

U.S. PATENT DOCUMENTS

| 4,665,385 A | 5/1987 | Henderson |
| 4,737,448 A | 4/1988 | Hochberg |

(Continued)

FOREIGN PATENT DOCUMENTS

| CN | 101036395 A | 9/2007 |
| CN | 101561620 A | 10/2009 |

(Continued)

OTHER PUBLICATIONS

Office Action dated Jul. 18, 2013, in U.S. App. No. 12/987,118, filed Jan. 9, 2011, 30 pages.
(Continued)

*Primary Examiner* — Bumsuk Won
*Assistant Examiner* — Charles Chang
(74) *Attorney, Agent, or Firm* — Christensen O'Connor Johnson Kindness PLLC

(57) ABSTRACT

A portable image-capturing device with embedded projector comprises a control integrated circuit; an image-capturing module coupled to said control integrated circuits for capturing an image; a memory coupled to said control integrated circuits for storing said captured image; a projection module coupled to said control integrated circuits to project said captured image stored in said memory or from an external device outside said portable image-capturing device; wherein said projection module includes a color control module coupled to a light source unit for switching said light source unit to emit R, G, B color light in sequence; a reflective-type panel coupled to said control integrated circuits so as to reflect light fed from said light source unit; and a projection lens positioned in the reflected light path from said reflective-type panel to project the image.

5 Claims, 12 Drawing Sheets

Related U.S. Application Data continuation-in-part of application No. 11/701,158, filed on Jan. 31, 2007, now Pat. No. 8,953,103, which is a continuation of application No. 10/989,622, filed on Nov. 15, 2004, now Pat. No. 7,178,735, application No. 13/152,621, which is a continuation-in-part of application No. 12/711,366, filed on Feb. 24, 2010, now abandoned, and a continuation-in-part of application No. 12/987,118, filed on Jan. 9, 2011, now abandoned.

(51) Int. Cl.
| | | |
|---|---|---|
| *H04M 1/725* | (2006.01) | |
| *H04N 1/00* | (2006.01) | |
| *H04N 7/18* | (2006.01) | |
| *H04N 9/31* | (2006.01) | |
| *H04N 21/414* | (2011.01) | |
| *H04N 5/44* | (2011.01) | |
| *H04N 5/74* | (2006.01) | |
| *H04N 21/41* | (2011.01) | |

(52) U.S. Cl.
CPC ........... *H04N 9/3173* (2013.01); *H04N 9/3176* (2013.01); *H04N 9/3197* (2013.01); *H04N 21/41407* (2013.01); *H04M 1/72533* (2013.01); *H04N 1/00307* (2013.01); *H04N 21/4122* (2013.01); *H04N 2005/4425* (2013.01); *H04N 2005/745* (2013.01); *H04N 2201/0084* (2013.01)

(56) References Cited

U.S. PATENT DOCUMENTS

| | | | |
|---|---|---|---|
| 4,809,810 | A | 3/1989 | Elfman |
| 5,050,965 | A | 9/1991 | Conner |
| 5,124,818 | A | 6/1992 | Conner |
| 5,150,138 | A | 9/1992 | Nakanishi |
| 5,500,692 | A | 3/1996 | Onozuka |
| 5,517,189 | A | 5/1996 | Bachhuber |
| 5,537,258 | A | 7/1996 | Yamazaki et al. |
| 5,818,634 | A | 10/1998 | Richard |
| 5,883,465 | A | 3/1999 | Inoguchi |
| 5,907,407 | A | 5/1999 | Atkinson |
| 6,023,371 | A | 2/2000 | Onitsuka |
| 6,052,166 | A | 4/2000 | Chikazawa |
| 6,073,034 | A | 6/2000 | Jacobsen |
| 6,085,112 | A | 7/2000 | Kleinschmidt |
| 6,292,305 | B1 | 9/2001 | Sakuma |
| 6,552,754 | B1 | 4/2003 | Song et al. |
| 6,556,181 | B2 | 4/2003 | Yamada et al. |
| 6,594,616 | B2 | 7/2003 | Zhang |
| 6,626,543 | B2 | 9/2003 | Derryberry |
| 6,655,597 | B1 | 12/2003 | Swartz |
| 6,710,909 | B2 | 3/2004 | Naito |
| 6,733,137 | B2 | 5/2004 | Tomiya |
| 6,805,448 | B2 | 10/2004 | Yokoyama |
| 6,988,808 | B2 | 1/2006 | Cromer |
| 7,050,035 | B2 | 5/2006 | Iisaka |
| 7,059,732 | B2 | 6/2006 | Oross |
| 7,070,281 | B2 | 7/2006 | Kato |
| 7,170,671 | B2 | 1/2007 | Wu |
| 7,173,586 | B2 | 2/2007 | Osame |
| 7,178,735 | B2 | 2/2007 | Chiang |
| 7,213,924 | B2 | 5/2007 | Okuyama |
| 7,270,425 | B2 | 9/2007 | Arai et al. |
| 7,303,291 | B2 | 12/2007 | Ikeda et al. |
| 7,311,403 | B2 | 12/2007 | Yoshii et al. |
| 7,434,945 | B2 | 10/2008 | Maeda et al. |
| 7,500,758 | B1 * | 3/2009 | Adachi et al. ............... 353/101 |
| 7,724,247 | B2 | 5/2010 | Yamazaki |
| 7,751,650 | B2 | 7/2010 | Tada |
| 7,874,486 | B2 | 1/2011 | Chiang |
| 7,896,501 | B2 | 3/2011 | Huang |
| 7,914,150 | B2 | 3/2011 | Yamazaki |
| 8,011,792 | B2 | 9/2011 | Inoue |
| 8,021,001 | B2 | 9/2011 | Iwanaga |
| 8,045,273 | B2 | 10/2011 | Chen et al. |
| 8,052,281 | B2 | 11/2011 | Huang |
| 8,127,995 | B2 | 3/2012 | Chiang |
| 2002/0036694 | A1 * | 3/2002 | Merril ............... 348/220 |
| 2003/0092470 | A1 | 5/2003 | Kurakane |
| 2004/0017518 | A1 | 1/2004 | Stern |
| 2004/0135975 | A1 | 7/2004 | Wang |
| 2004/0206825 | A1 | 10/2004 | Schmidt |
| 2004/0207822 | A1 | 10/2004 | Lee |
| 2004/0224081 | A1 | 11/2004 | Sheu |
| 2004/0268383 | A1 | 12/2004 | Sezan |
| 2005/0005102 | A1 | 1/2005 | Meggitt |
| 2005/0035701 | A1 | 2/2005 | Choi |
| 2005/0054337 | A1 | 3/2005 | Nobusawa |
| 2005/0083486 | A1 | 4/2005 | Johnson |
| 2005/0127375 | A1 * | 6/2005 | Erchak et al. ............... 257/79 |
| 2005/0254127 | A1 | 11/2005 | Evans |
| 2005/0286123 | A1 | 12/2005 | Abu-Ageel |
| 2006/0007364 | A1 * | 1/2006 | Kuan et al. ............... 349/5 |
| 2006/0023172 | A1 | 2/2006 | Ikeda et al. |
| 2006/0098451 | A1 * | 5/2006 | Hsu et al. ............... 362/555 |
| 2006/0102713 | A1 | 5/2006 | Chiang |
| 2006/0146007 | A1 | 7/2006 | Lim |
| 2006/0209374 | A1 * | 9/2006 | Willemsen ............... 359/205 |
| 2007/0001104 | A1 | 1/2007 | Yokote |
| 2007/0046866 | A1 | 3/2007 | Lee et al. |
| 2007/0080845 | A1 | 4/2007 | Amand |
| 2007/0132963 | A1 | 6/2007 | Chiang |
| 2007/0146655 | A1 | 6/2007 | Li |
| 2007/0195287 | A1 | 8/2007 | Chiang |
| 2008/0084544 | A1 | 4/2008 | Hall |
| 2008/0100804 | A1 | 5/2008 | Kanayama |
| 2008/0180641 | A1 | 7/2008 | Chiang |
| 2008/0259283 | A1 | 10/2008 | Maeda |
| 2008/0297729 | A1 | 12/2008 | Fujinawa et al. |
| 2009/0315921 | A1 | 12/2009 | Sakaigawa |
| 2010/0079734 | A1 | 4/2010 | Rehn et al. |
| 2010/0091249 | A1 | 4/2010 | Benedix et al. |
| 2010/0149437 | A1 | 6/2010 | Chiang |
| 2010/0159850 | A1 | 6/2010 | Chiang |
| 2010/0328935 | A1 | 12/2010 | Pance |
| 2011/0090466 | A1 | 4/2011 | Chiang |
| 2011/0133899 | A1 | 6/2011 | Shachar |
| 2011/0310357 | A1 | 12/2011 | Chiang |
| 2012/0081408 | A1 | 4/2012 | Chiang |
| 2012/0113396 | A1 | 5/2012 | Chiang |
| 2012/0170003 | A1 | 7/2012 | Chiang |
| 2013/0127934 | A1 | 5/2013 | Chiang |

FOREIGN PATENT DOCUMENTS

| | | | |
|---|---|---|---|
| EP | 1 416 702 | A1 | 5/2004 |
| TW | 200742929 | A | 3/2002 |
| TW | M334948 | U | 6/2008 |
| TW | 200841109 | A | 10/2008 |
| TW | 200905361 | A | 2/2009 |
| TW | 200937099 | A | 9/2009 |
| WO | 2005/006720 | A1 | 1/2005 |

OTHER PUBLICATIONS

Chinese Office Action dated Mar. 6, 2013, in Chinese Patent Application No. 2010101333795, filed Mar. 10, 2010, 10 pages.

Cotting, D., et al., "Embedding Imperceptible Patterns Into Projected Images for Simultaneous Acquisition and Display," Proceedings of the Third IEEE and ACM International Symposium on Mixed and Augmented Reality (ISMAR '04), Washington, D.C., Nov. 2-5, 2004, 10 pages.

Van Kessel, Re., et al., "A MEMS-Based Projection Display," Proceedings of the IEEE, 86(8)1687-1704, Aug. 1998.

Office Action mailed Jun. 3, 2005, in U.S. Appl. No. 10/989,622, filed Nov. 15, 2004, 9 pages.

Office Action mailed Nov. 16, 2005, in U.S. Appl. No. 10/989,622, filed Nov. 15, 2004, 10 pages.

(56) References Cited

OTHER PUBLICATIONS

Final Office Action mailed May 17, 2006, in U.S. Appl. No. 10/989,622, filed Nov. 15, 2004, 10 pages.
Notice of Allowance mailed Oct. 6, 2006, in U.S. Appl. No. 10/989,622, filed Nov. 15, 2004, 8 pages.
Restriction Requirement mailed Dec. 1, 2008, in U.S. Appl. No. 11/701,158, filed Jan. 31, 2007, 5 pages.
Office Action mailed Apr. 2, 2009, in U.S. Appl. No. 11/701,158, filed Jan. 31, 2007, 17 pages.
Final Office Action mailed Nov. 9, 2009, in U.S. Appl. No. 11/701,158, filed Jan. 31, 2007, 8 pages.
Advisory Action mailed Feb. 3, 2010, in U.S. Appl. No. 11/701,158, filed Jan. 31, 2007, 4 pages.
Office Action mailed Feb. 29, 2012, in U.S. Appl. No. 11/701,158, filed Jan. 31, 2007, 9 pages.
Office Action mailed May 6, 2010, in U.S. Appl. No. 11/783,551, filed Apr. 10, 2007, 9 pages.
Notice of Allowance mailed Oct. 28, 2010, in U.S. Appl. No. 11/783,551, filed Apr. 10, 2007, 7 pages.
Office Action mailed Jan. 12, 2010, in U.S. Appl. No. 11/734,175, filed Apr. 11, 2007, 11 pages.
Office Action mailed May 17, 2011, in U.S. Appl. No. 12/711,366, filed Feb. 24, 2010, 5 pages.
Office Action mailed Nov. 10, 2010, in U.S. Appl. No. 12/718,150, filed Mar. 5, 2010, 5 pages.
Final Office Action mailed Apr. 5, 2011, in U.S. Appl. No. 12/718,150, filed Mar. 5, 2010, 7 pages.
Office Action mailed Sep. 7, 2011, in U.S. Appl. No. 12/954,687, filed Nov. 26, 2010, 8 pages.
Notice of Allowance mailed Nov. 18, 2011, in U.S. Appl. No. 12/954,687, filed Nov. 26, 2010, 8 pages.
Taiwanese Office Action dated Sep. 6, 2013, in Taiwanese Patent Application No. 099141526, filed Nov. 30, 2010, 10 pages.
Taiwanese Office Action dated Sep. 24, 2013, in Taiwanese Application No. 100121326, filed Jun. 7, 2011, 6 pages.
Office Action dated Jun. 6, 2013, in U.S. Appl. No. 11/701,158, filed Jan. 31, 2007, 12 pages.
Notice of Allowance dated Jun. 3, 2013, in U.S. Appl. No. 13/237,934, filed Sep. 21, 2011, 13 pages.
Notice of Allowance dated Apr. 15, 2013, in U.S. Appl. No. 13/355,482, filed Jan. 20, 2012, 12 pages.
Final Office Action mailed Aug. 14, 2012, in U.S. Appl. No. 11/701,158, filed Jan. 31, 2007, 17 pages.
Office Action mailed Nov. 7, 2012, in U.S. Appl. No. 11/701,158, filed Jan. 31, 2007, 10 pages.
Office Action dated Dec. 2, 2013, in U.S. Appl. No. 13/214,496, filed Aug. 22, 2011, 40 pages.
Office Action dated Dec. 17, 2013, in U.S. Appl. No. 11/701,158, filed Jan. 31, 2007, 25 pages.
Office Action dated Dec. 27, 2013, in U.S. Appl. No. 13/342,509, filed Jan. 3, 2012, 42 pages.
Office Action dated Jan. 30, 2014, in U.S. Appl. No. 12/987,118, filed Jan. 9, 2011, 35 pages.
Notice of Allowance dated Dec. 17, 2013, in U.S. Appl. No. 13/237,934, filed Sep. 21, 2011, 27 pages.
Notice of Allowance dated Jan. 7, 2014, in U.S. Appl. No. 13/355,482, filed Jan. 20, 2012, 29 pages.
Taiwanese Office Action dated Nov. 18, 2013, in Taiwanese Patent Application No. 099106049, filed Mar. 2, 2010, 6 pages (with English Language Summary).
Notice of Allowance dated Apr. 24, 2014, in U.S. Appl. No. 11/701,158, filed Jan. 31, 2007, 14 pages.
Taiwanese Office Action dated Mar. 5, 2014, in Taiwanese Patent Application No. 100123171, filed Jun. 30, 2011, 9 pages.

\* cited by examiner

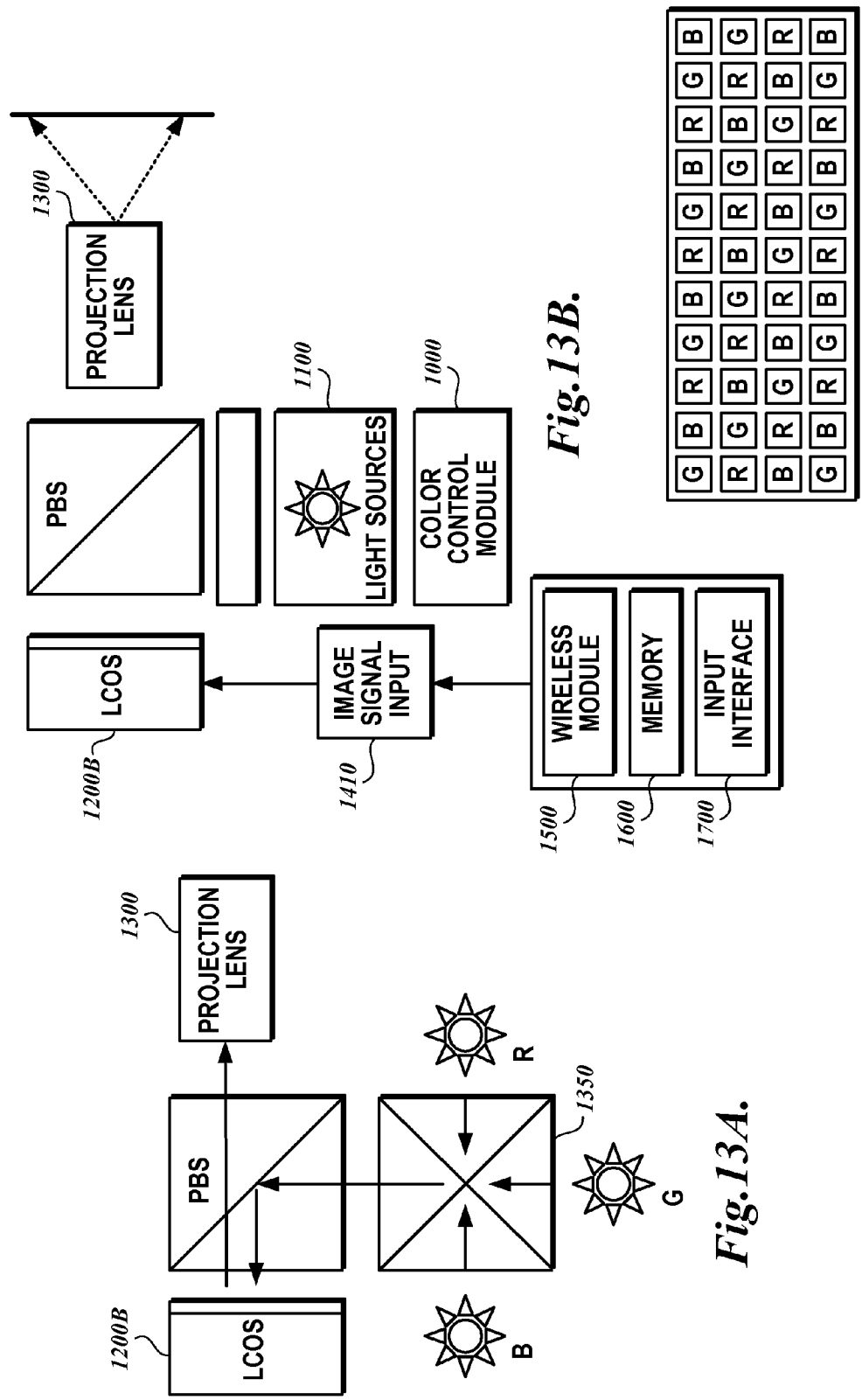

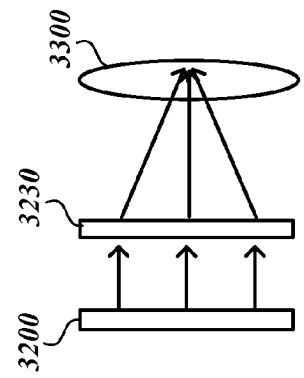
*Fig.16C.*
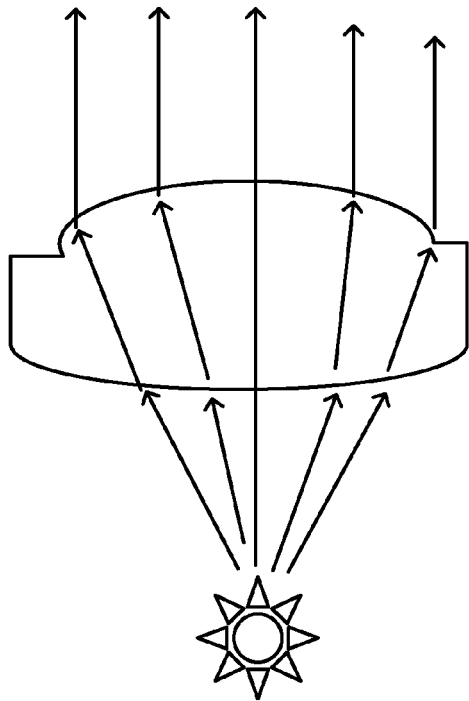
*Fig.16D.*
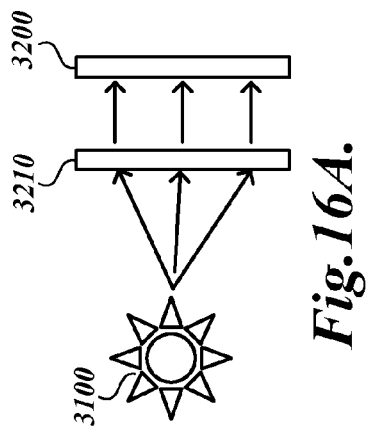
*Fig.16A.*
*Fig.16B.*
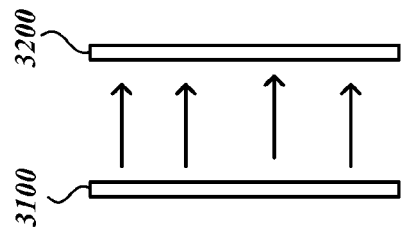
*Fig.16.*

PORTABLE IMAGE-CAPTURING DEVICE WITH EMBEDDED PROJECTOR

CROSS-REFERENCE TO RELATED APPLICATIONS

This application is a continuation-in-part of U.S. patent application Ser. No. 12/954,687, filed Nov. 26, 2010 (now U.S. Pat. No. 8,127,995), which is a continuation of U.S. application Ser. No. 11/783,551, filed Apr. 10, 2007 (now U.S. Pat. No. 7,874,486), which is a continuation-in-part of U.S. patent application Ser. No. 11/701,158, filed Jan. 31, 2007, which is a continuation of U.S. patent application Ser. No. 10/989,622, filed Nov. 15, 2004 (now U.S. Pat. No. 7,178,735). This application is also a continuation-in-part of U.S. patent application Ser. No. 12/711,366, filed Feb. 24, 2010 (now abandoned). This application is also a continuation-in-part of U.S. patent application Ser. No. 12/987,118, filed Jan. 9, 2011.

BACKGROUND

Cellular communications systems typically include multiple base stations for communicating with mobile stations in various geographical transmission areas. Each base station provides an interface between the mobile station and a telecommunications network. Mobile telephone systems are in use or being developed in which the geographic coverage area of the system is divided into smaller separate cells, which communicate with the network via a fixed station located in the cell. Mobile telephones belonging to the system are free to travel from one cell to another. When a subscriber within the same system or within an external system wishes to call a mobile subscriber within this system, the network must have information on the actual location of the mobile telephone.

Recently, the price of cellular telephones, digital still cameras, and digital video cameras has been greatly reduced and become affordable to more people. It is common that a person owns more than one cellular phone. Some people even replace their cellular telephones, digital still camera, or digital video camera as often as they replace their clothes or hairstyle. The cellular telephone, digital still camera, and digital video camera manufacturers have to release new models with different appearances, functions, and styles more frequently so as to attract the attention of the buyer and occupy a favorable market share. Furthermore, the conventional projector employs a white light lamp as a light source; therefore, at least two reflector lenses and at least three light-split lenses are required to split the white light into three colors (red, green, and blue). The optical lens set is expensive. The mechanism of the optical system is complicated and the size is difficult to reduce. Further, the lamp source will generate heat with of high temperature. Another type of projector is called a digital light projector. U.S. Pat. Nos. 6,733,137 and 6,988,808 disclose such projectors. This type of projector employs DMD (digital micro-mirror device) and a color wheel for projecting. The digital mirror device has several hundreds of thousands of mirror elements and it is capable of reducing a difference in chromaticness (tint) caused by performance/characteristic variation between filters or between light sources. A driving unit controls an inclination of each of the mirror elements of a DMD panel according to a corrected video signal and a revolution state of a color filter wheel, wherein the correcting unit corrects the luminance signal for each color of the video signals by calculating a relative intensity of light having passed through each filter making up the color filter wheel using the output of a photosensor occurring when each mirror element of the DMD panel is put in the OFF state. The color filter wheel is driven by a motor and its size is not small; consequently, it is difficult to embed the projecting device into a portable device. Further, the conventional technology employs white light as the light source and it operates at high temperatures. The projector needs a lot of lenses to cooperate with the light source and the color filter wheel as well. A low-frequency flashing effect occurs due to the white light passing through the high-speed revolution color wheel which is driven by the motor. As recognized herein, for portability, it is desirable to configure the projector to be as slim as possible. But the goal of size reduction is frustrated by the presence of the elements mentioned above.

SUMMARY

The present disclosure describes a digital video camera or digital still camera having an embedded projector. For example, the portable image-capturing device with embedded projector comprises a control integrated circuit; an image-capturing module coupled to said control integrated circuit for capturing an image; a memory coupled to said control integrated circuit for storing said captured image; a projection module coupled to said control integrated circuit to project said captured image in said memory or from an external device outside said portable image-capturing device; wherein said projection module includes a color control module coupled to a light source unit for switching said light source unit to emit R, G, B color light in sequence; a reflective-type panel coupled to said control integrated circuit so as to reflect light fed from said light source unit; and a projection lens positioned in the reflected light path from said reflective-type panel to project the image. The reflective-type panel includes a digital minor device panel having a plurality of mirror elements or a LCOS (liquid crystal on silicon) panel. The light source unit may include an OLED element, LED element, laser diode, electroluminescence element, or field-emitting element to emit light of red, green, or blue.

As another example, the portable image-capturing device with embedded projector comprises a control integrated circuit; an image-capturing module coupled to the control integrated circuit for capturing image; a memory coupled to the control integrated circuit for storing the captured image; a projection module coupled to the control integrated circuit to project the captured image in the memory or from an external device outside the portable image-capturing device; wherein the projection module includes a light source unit; a reflective-type device coupled to the control integrated circuit so as to reflect light emitted from the light source unit to a screen for projecting the image; and a color combiner coupled to the light source unit to combine the R, G, B light from the light source unit. The light source unit includes R, G, B sources adjacent to the color combiner, respectively. Alternatively, the light source unit includes R, G, B sources at one side and the projection module including three reflector minors arranged in a line to reflect the light source unit, respectively. In another embodiment, the portable image-capturing device with embedded projector comprises a control integrated circuit; an image-capturing module coupled to the control integrated circuit for capturing the image; a memory coupled to the control integrated circuit for storing the captured image; a projection module coupled to the control integrated circuit to project the captured image in the memory or from an external device outside the portable image-capturing device; wherein the projection module includes a light source unit; a transmissive-type panel coupled to the control integrated circuit so as to allow light emitted from the light source unit to pass through the transmissive-type panel; and projection lens positioned in light path from the transmissive-type panel to project the image. In one example, the at least one transmissive-type panel includes a color filter. In a further example, the projector module includes a color control module coupled to the light source unit for switching the light source unit to emit R, G, B color light in sequence to pass through the transmissive-type panel, having the light source unit for projection; and a prism located adjacent to three transmissive-type displays. In another case, the projector module includes three transmissive-type panels; and a prism located adjacent to the three transmissive-type panels for color combination.

FIGS. 14-16 show a diagram of another projector module according to the present disclosure.

DETAILED DESCRIPTION

The present disclosure relates generally to a projecting module for a portable terminal or stand alone projector. The term portable terminal includes, but is not limited to, a cellular phone, PDA (personal digital assistant), smart phone, notebook computer, media player (MP3, MP4), GPS device, digital still camera, digital video camera, and the like.

Figure 1B:
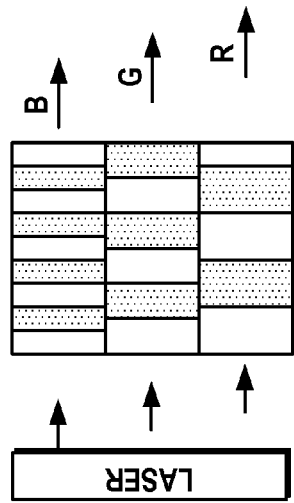
FIG. 1 shows a diagram of a projector and FIGS. 1A, 1B show a diagram of the color light source unit according to the present disclosure.
Figure 1:
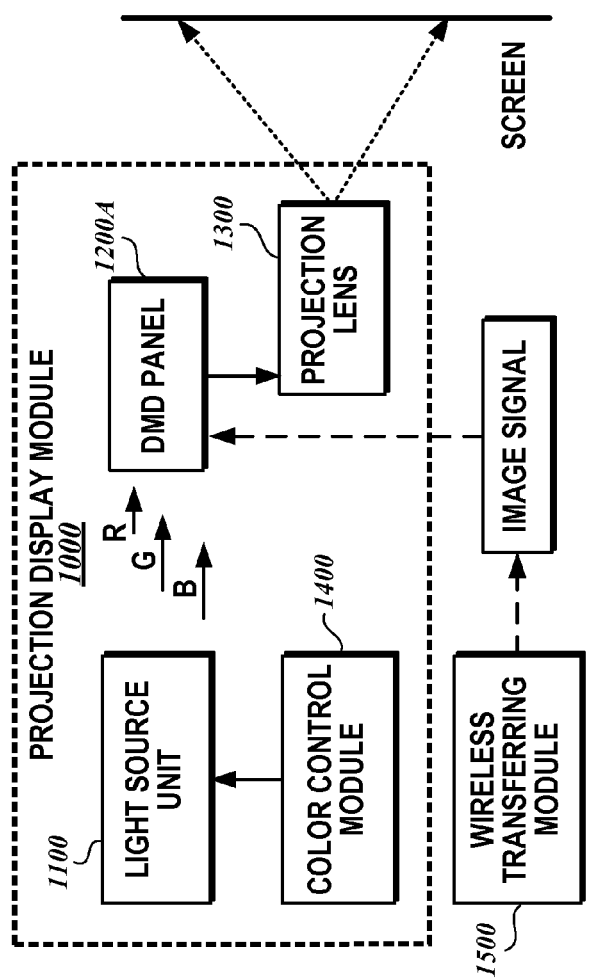

FIG. 1 is a diagram illustrating the main components of a filter free projector using a reflective-type panel, for example, a DMD (Digital Micro-mirror Device) panel according to an embodiment of the present disclosure. The DMD may be replaced by a Liquid Crystal on Silicon (LCOS) panel to act as the reflective-type panel. A PBS can be introduced to guide the illumination for an LCOS-type panel, as shown in FIGS. 13A-C. In the embodiment of FIG. 1, the filter-free projector 1000 of the embodiment, as shown in FIG. 1, includes a light source unit 1100, a DMD panel 1200, and projection lens 1300. Some elements (such as a lens amplifier, a converter, a correcting section, and a driving section) also may be included. In one embodiment, the lens amplifier may be located between the light source unit 1100 and the DMD panel 1200. The DMD panel 1200 includes a plurality of micro-minor elements (not shown) which are controlled by the driving section. The driving section produces image light to be projected onto the screen and the inclination state of each of the mirror elements (not shown) is according to a switching state of the color light source state. The light source unit 1100 may emit mono-light with red, green, or blue, respectively. A color control module 1400 is coupled to the light source unit 1110 to determine which color of light will be emitted. The signal to be fed in from the correcting section and the inclination state of each of the minor elements cooperates with the alternation state of the color light source unit 1100. The color control module 1400 is employed to switch the colors, and it may be formed by integrated circuits. The switching time of the color is far faster than the wheel of the prior art. It reduces time required for switching colors in the color wheel. The switching of the color light unit causes the light to be emitted in order of the red, blue, and green colors and the switched light is output to DMD panel 1200. Preferably, the color control module 1400 causes the light source unit 1100 to emit the red, blue, and green color light in a sequence, and can repeat the sequence. The order of the colors can be altered. The color light source unit 1100 has plural color segments and, if desired, for brightness, a white segment. Preferably, the unit 1100 includes a red color segment, followed by a green segment, which in turn is followed by a blue segment. In order to increase image brightness, each blue segment may be followed by a white segment.

Figure 2:
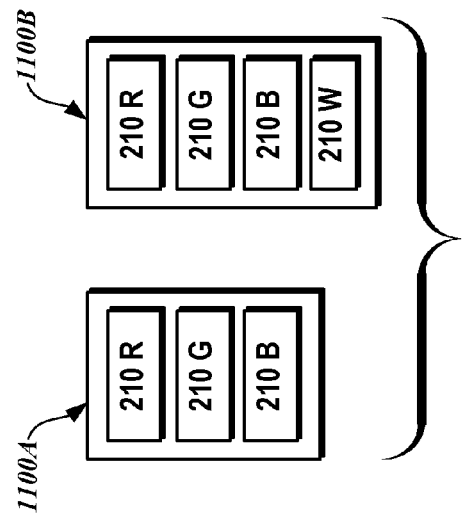
FIG. 2 shows a diagram of a color light source unit according to the present disclosure.

Electrical discharge lamps, such as metal halide lamps, or halogen lamps, could be used in the light source unit. FIG. 2 shows example light source units 1100A, 1100B. In one embodiment, the light source unit 1100A comprises three light-emitting sources 210R, 210G, and 210B and is employed and positioned in correspondence with the DMD panel 1200, respectively. In one embodiment, the light-emitting sources 210R, 210G, and 210B are organic EL (electroluminescence) elements. These organic EL elements are electric-field light-emitting thin films that are capable of emission of red, green, and blue light. The DMD panel 1200 is positioned on the light-incidence side. The projection lens 1300 could be made up of a plurality of lenses. Thus, the data or file stored in the memory of the device or external device can be projected on a screen or wall. It allows the user to project the image, game, or file on an external screen. The EL element is small, flat form, and lightweight; therefore, it allows the small projection to be integrated in the portable device. The light source unit can be formed by three mono-light EL devices or a single EL device which may emit three mono-lights. In another case, the light source unit 1100B includes light-emitting sources 210W for emitting white light. The light source may be made of thin film, and thereby it can be embedded into the portable device.

The digital mirror device panel includes a plurality of mirror elements each being controlled so as to be put in a first inclination state and in a second inclination state and reflecting light fed from the light source unit and switched by the control module while being put in the first inclination state. A driving unit is used to control so as to put each of the minor elements in the digital mirror device panel in the first inclination state or the second inclination state according to a corresponding video signal and a switching state of the color control unit. A correcting unit is used to receive a video signal and the voltage obtained by photoelectric conversion device to correct the video signal, based on the received voltage, and to output the corrected video signal to the driving unit. The color control module 1400 is configured to include a red, green and blue color light source for making image light of the plurality of colors. The projector may include a digital signal processor mounted on a DLP circuits board.

Figure 3:
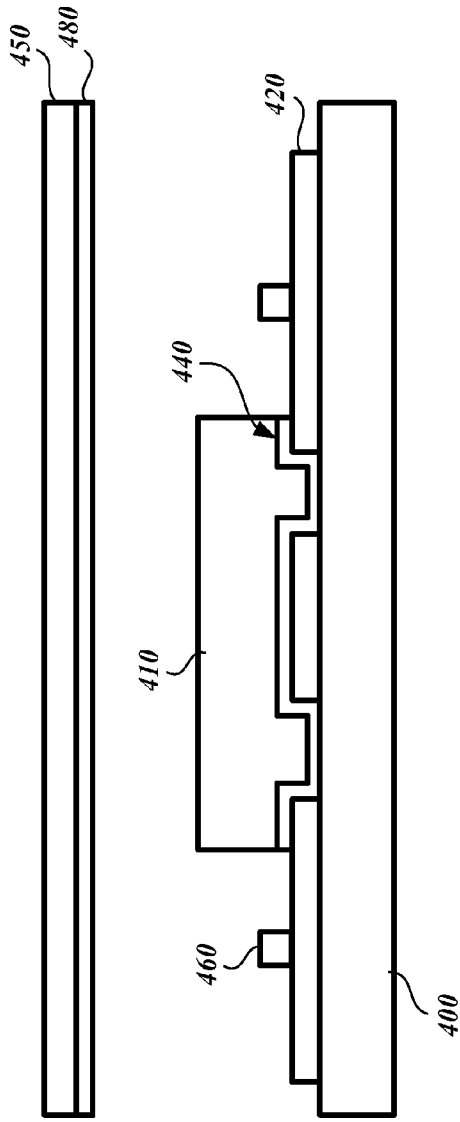
FIG. 3 shows a diagram of a field-emitting device according to the present disclosure.
Figure 4:
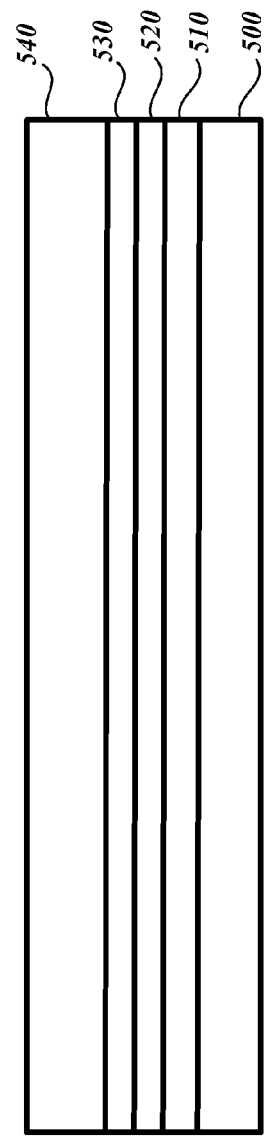
FIG. 4 shows a diagram of an EL-emitting source according to the present disclosure.

Another embodiment of light source is shown in FIG. 4, which is a cross-sectional view of the field emission device (FED) according to an embodiment of the present disclosure. As seen in FIG. 3, a transparent substrate 400 is provided and transparent electrodes 420 are formed on the glass substrate 400. The transparent electrodes 420 may be made of indium tin oxide (ITO) and may be used as emitter electrodes.

Figure 1A:
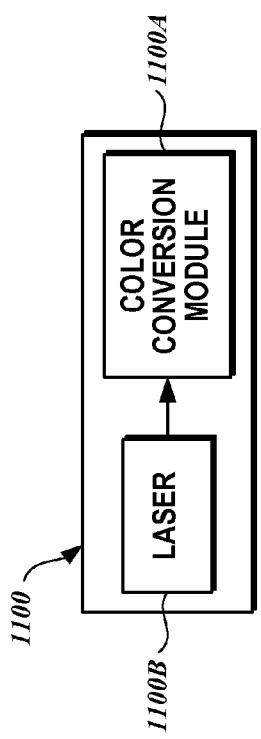

Stacked gate 410 covers a portion of the transparent electrodes 420, which are formed on the glass substrate 400. Emitters 460 that emit electrons are formed on a portion of the transparent electrode 420. Each stacked gate 410 includes a mask layer 440 that covers a portion of the transparent electrodes and is formed by an ultraviolet (UV) photolithograph mask. The mask layer 440 is preferably transparent to visible light, but opaque to UV rays and can be made of an amorphous silicon layer. The silicon layer will be transparent when the thickness is thin enough. A stacked gate 410 structure includes a first insulating layer, a gate electrode, a second insulating layer, and a focus gate electrode, sequentially formed over the substrate. The gate insulating layer is preferably a silicon oxide thin film with a thickness of 2 μm or more and the gate electrode is made of chrome with a thickness of about 0.25 μm. The gate electrode is used for extracting an electron beam from the emitter. The focus gate electrode performs as a collector for collecting electrons emitted from the emitter so that the electrons can reach a fluorescent film 480 disposed above the emitter 460. If the device is used for display, the substrate can be silicon or transparent substrate. Referring to FIG. 3, a front panel 450 is disposed upward and above the stacked gate. A variety of visual images are can be displayed on the front panel 450. A fluorescent film 480 is attached to a bottom surface of the front panel 450 that laces the stacked gate and a direct current voltage is applied to the fluorescent film 480 to emit color for display. The fluorescent substance may emit color light by mixing the emitted light if the thin film with R, G, B fluorescent substances. The present disclosure describes three such emission displays that separately display an image in red components, green components, and blue components (namely, red, green, and blue images). The fluorescent substances emit red, green, and blue visible light when excited by the electron beam which is evenly distributed on the fluorescent film 480. A spacer separating the front panel 450 from the stacked gate is a black matrix layer and is not shown for convenience. Due to the thin film display formed with the thinner thickness and the power consumption being lower than an LCD, the present disclosure may provide a smaller size, lighter weight device. The life of a battery may last longer. The field emission device does not require complicated, power-consuming back lights and filters which are necessary for LCD. Moreover, the device does not require large arrays of thin film transistors, and thus, a major source of high cost and yield problems for active matrix LCDs is eliminated. The resolution of the display can be improved by using a focus grid to collimate electrons drawn from the microtips. Preferably, the emitter includes a carbon nanotube emitter to further reduce the device size. Further, the display may omit the liquid crystal material. Further, the field emission display does not require the S/D regions which are required by TFT for LCD. Preferably, the LED source may irradiate mono-color light. Namely, blue light, red light, and green light LEDs are employed to act as the light source. In one case, the LED may be formed in a matrix or linear configuration. Please note that the elements with fluorescent substances shown in FIG. 3 (carbon nanotube field emission device if the emitter is formed by carbon nanotube) and FIG. 4 (EL) can be used as a light source as well. Similarly, the light source unit can be formed by three mono-light FED (or EL) or a single FED (EL) which may emit three mono-lights. For the organic EL display, refer to U.S. Pat. No. 6,023,371, entitled "Color conversion material, and organic electroluminescent color display using the same." Please note, a laser diode may be used as a light source. Alternatively, the color light source unit 1100 may be composed of a laser 1100B and a color conversion module 1100A positioned on the light path of the laser, as shown in FIG. 1A. Preferably, color conversion module 1100A may be achieved by an efficient laser wavelength conversion technology, which enables the generation and conversion of new laser wavelengths via the material's nonlinear character. Based on engineered microstructures within ferroelectric nonlinear materials, quasi-phase-matching (QPM) is generated to compensate the phase-velocity mismatching between interaction waves for efficient wave-mixings. The QPM enables laser-based R, G, B display applications. In order to achieve efficient wavelength conversion, phase matching between interaction waves is required. This has been done in nonlinear materials through birefringence phase-matching techniques, which orient crystal axis to a specific angle to achieve a phase-matching condition for specific interaction wavelengths. U.S. Pat. No. 7,170,671, entitled "High efficiency wavelength converters" discloses one method of the wavelength conversion. For example, the color conversion module 1100A may include a waveguide with multiple gratings with different periodic patterns, as shown in FIG. 1B. The color conversion module may include a waveguide device or bulk device. The grating could be uniform grating, multiple grating, cascade grating, fan out grating, and chirped grating. The laser sequentially provides the radiation to the color conversion module 1100A, thereby converting the incident light into R, G, B, respectively.

In another embodiment, the light source of FIG. 4 includes a transparent electrode 510 on a transparent substrate 500. A fluorescent film or powder 520 is attached to an upper surface of the lower transparent electrode 510. Preferably, the fluorescent substance emits colored light. The present disclosure describes three such devices that separately emit light in red components, green components, and blue components. Each irradiates a single color light. Different powder emits different color. An upper transparent electrode 530 is formed on the fluorescent film or powder 520. A second transparent substrate 540 is formed on the transparent electrode 530. A bias is applied on the electrodes to inject a hole and an electron, thereby exciting the fluorescent substances by the combination of the electron and hole to emit red, green, or blue visible light depending on the compound of the fluorescent substances. The elements may refer to ELP. In the examples, the light-emitting device (LED) can be employed as a light source as well, and the mechanism and process is simpler than the prior art. Preferably, LED sources that irradiate blue light, red light, and green light LEDs are employed as the three mono-color light sources.

From above, the color filter wheel, high temperature white light source, and a lot of lenses, such as condense lenses, are removed according to the present disclosure. Therefore, the thermal issue, huge size, and flashing effect are solved by the present disclosure. Furthermore, the present disclosure describes employing thin film as a cold light source, with no high temperature thermal issue, where the lift time of the source is longer than the white light source of prior art, and where motor vibration noise is omitted. The power consumption is far lower than the prior art and it may be integrated into a small volume portable device. Having undergone switching by the color control module in such a manner that the light has any one of the red, blue, and green colors and travels toward the DMD panel 1200 and its luminous flux, the light may be calibrated by a relay lens (not shown) so that the light is effectively applied to the DMD panel 1200. The light applied to the DMD panel 1200 is incident on each of the mirror elements. The DMD panel 1200 receives an input signal with a gray level signal used to control an inclination of each of the mirror elements according to a gray level of each of the red, blue, and green colors represented by a video signal. The correction method and the control of a state of inclination of mirror need not be described further. Each image light is obtained by operating mirror elements of the DMD panel 1200, thereby projecting a single picture element on the screen. Since switching of the color light source unit is sufficiently fast, previous light stays as an afterimage detected by human eyes and almost no case occurs in which a color looks to have been decomposed.

Figure 5:
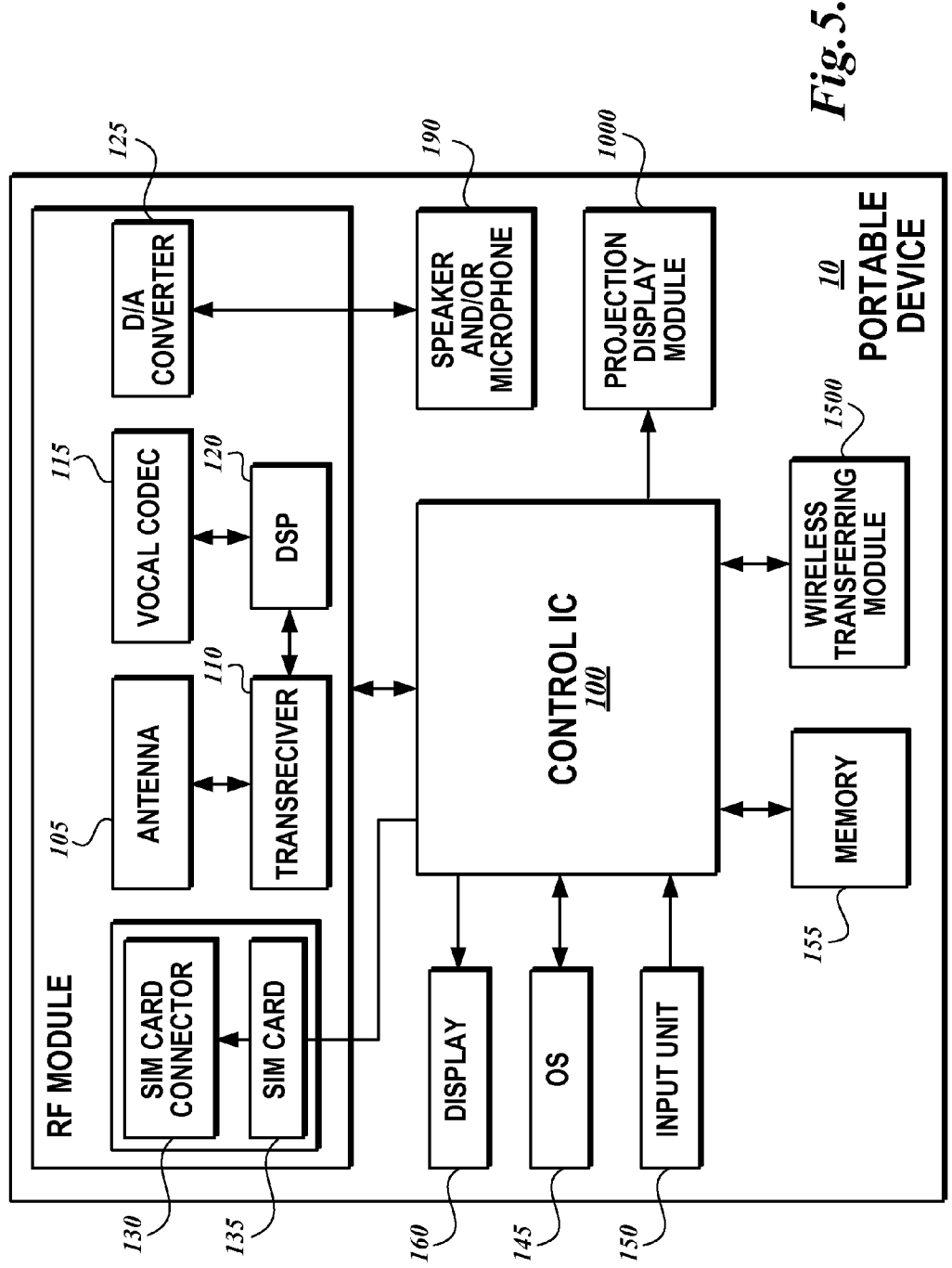
FIG. 5 shows a diagram of a mobile phone with a projector according to the present disclosure.

One or more embodiments of the present disclosure may be integrated into a portable device, for example, a cellular phone. FIG. 5 shows a block diagram of a portable terminal with SIM card connector 130 to carry the SIM card 135. As is well known in the art, the SIM card is not necessary for some types of cellular phones, such as in a PHS system. The diagram is used for illustration and not used for limiting the scope of the present disclosure. The portable terminal or device 10 includes an RF module. As known in the art, the RF module includes an antenna 105. This antenna 105 is connected to a transceiver 110, which is used to receive and transmit signals. The RF module further includes CODEC 115, DSP 120, and D/A converter 125 as well. The device 10 includes a central control IC 100, an input unit 150, a built-in display 160, OS 145, and memory 155 including a ROM program memory, a RAM memory, and a nonvolatile FLASH memory. The RF module may perform the functions of signal transmitting and receiving, frequency synthesizing, baseband processing, and digital signal processing. The SIM card hardware interface is used for receiving a SIM card. Finally, the signal is sent to the final actuators, i.e., a loudspeaker and a microphone 190.

Moreover, the portable terminal according to the device 10 shown in FIG. 5 includes the projection display module 1000. An embodiment is now described with reference to FIG. 1. A projection display module 1000 is coupled to the control IC 100. The projection lens 1300 could be made up of a plurality of lenses. Thus, the data or file stored in the memory of the device can be projected on a screen or wall. It allows the user to project the image, a game, or a file on an external screen. The EL element is small, flat form, and lightweight; therefore, it allows a small projection module to be integrated in the portable device. Similarly, the projecting module could be integrated into a notebook computer, PDA, video camera, digital still camera, game player, or media player.

The projector or the portable device may include a wireless transferring module 1500 coupled to the central control unit 100 for transferring data wirelessly, and it may be employed to transfer data between a hand-held device and an external device such as an access point or computer (local or remote terminal) via a network. In one embodiment, the wireless transmission module 1500 for short range refers to a WLAN (wireless local area network) module. As known, the WLAN may transfer data between a portable device and the external device. Thus, the device 10 may employ the wireless transmission module 1500 to exchange data. The wireless transmission module 1500 is compatible with the WiFi, 802.11 standard (802.11a, 802.11b, 802.11g, 802.11n), Bluetooth standard, or WiMax. In general, the wireless transmission module 1500 allows the device 10 to couple to the Internet via an access point, gateway, or computer. Thus, the user may download the material, data, image, game, audio, or video from the Internet and project the downloaded data on the screen.

Figure 6:
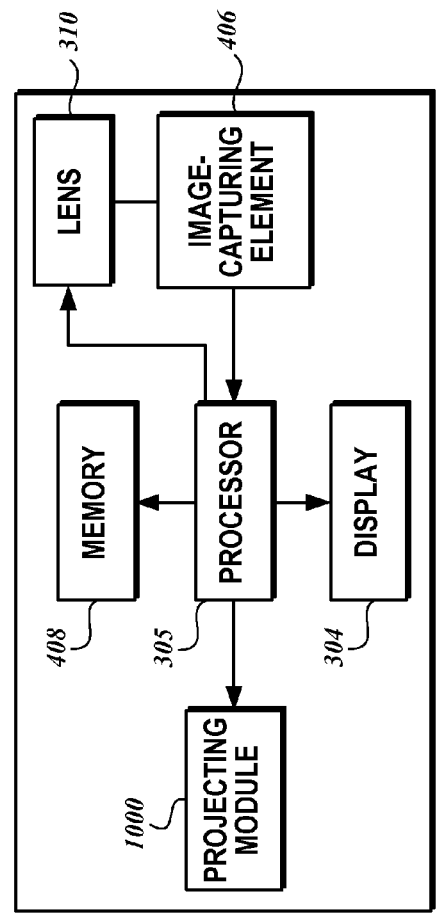
FIGS. 6 and 7 show diagrams of an image-capturing device and media player with a projector according to the present disclosure.
Figure 7:
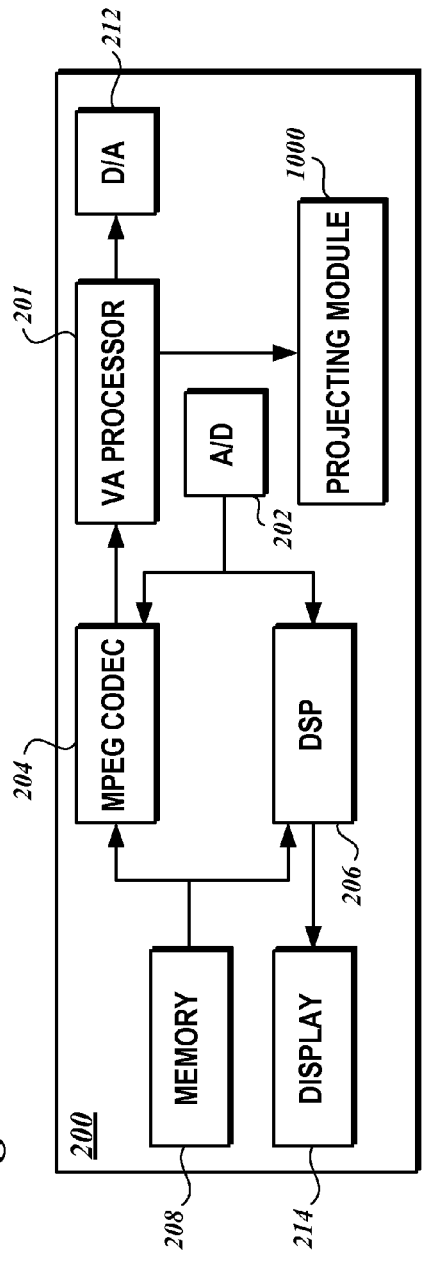

Further, referring to FIG. 6, the device includes a main body having a processor 305; a display 304 formed on the main body and coupled to the processor 305; an image capture element 406 formed within the main body and coupled to the processor 305; a memory 408 coupled to the processor; a lens mechanism 310 formed on the main body, coupled to the processor 305 and corresponding to the image-capturing element 406; the projecting module 1000 is coupled to a processor of the portable device so as to project the captured image on a screen.

If the projecting module 1000 is employed for a media player such as an MP3 player or MP4 player, the player includes an analog/digital (A/D) converter 202 for converting analog audio signals into digital audio signals. The analog audio signals can come from an audio source coupled to player 200. A digital signal processor (DSP) 206 or an audio and/or video driving module 204, for instance, an MP3 or MP4 codec, are coupled to the A/D converter 202 to receive the digital audio signals. In one embodiment, MP3 or MP4 codec 204 executes a firmware that includes an MPEG audio layer (e.g., MP3, MP2, or both) codec or video codec (e.g., MP4), and DSP 206 executes a firmware that includes a different type of audio codec (e.g., WMA, AAC, or both). In one embodiment, the firmware for DSP 204 also includes a video codec for encoding and decoding videos (e.g., MPEG-4 V1/V2/V3, DivX 3.11/4.0/5.0, Xvid, AVI/ASF, or any combination thereof). MP3 (or MP4) codec 204 and DSP 206 are coupled to a nonvolatile memory 208 that stores compressed audio data. The user can select an audio file from nonvolatile memory 208. Codec 204 and DSP 206 are coupled to an audio processor 201, which processes the digital audio signals according to default settings or user instructions. Audio processor 201 is coupled to a digital/analog (D/A) converter 212, which converts the digital audio signals into analog audio signals for the user. A display 214 is coupled to the DSP 206.

Figure 8:
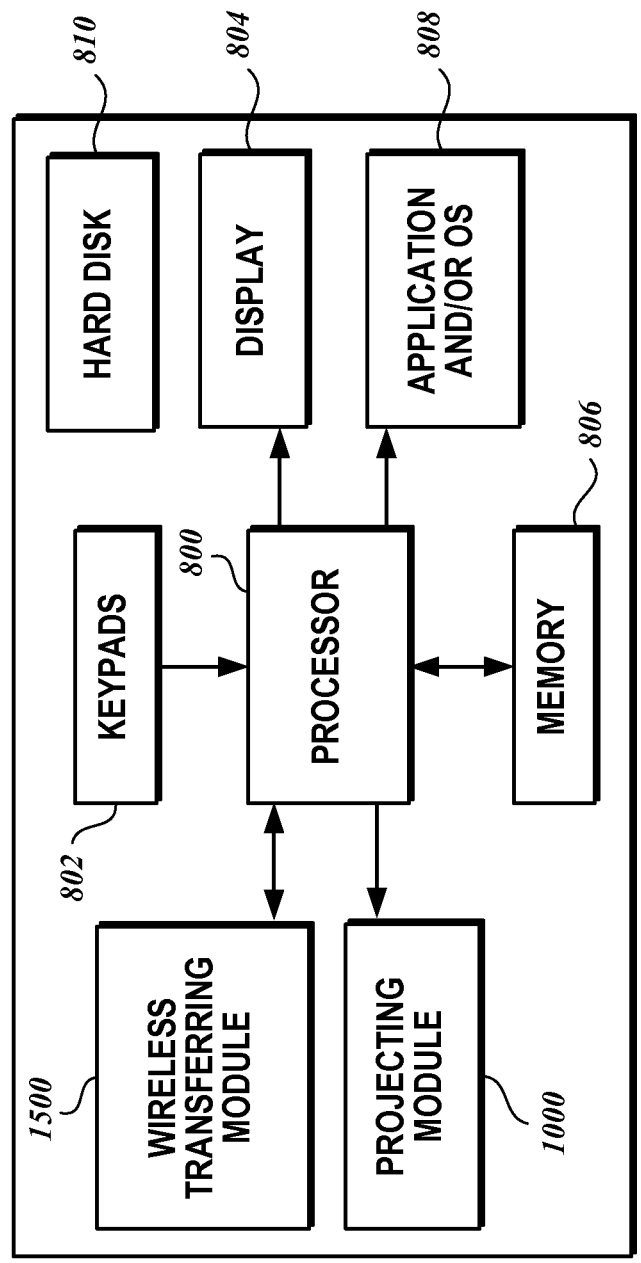
FIG. 8 shows a diagram of a computer (e.g., a notebook computer) with a projector according to the present disclosure.

As shown in FIG. 8, the projecting module 1000 can be integrated into the portable computer system comprising: a processor 800 formed within the portable device; a keypad 802 formed on the portable device; a display 804 coupled to the processor; and a memory 806 coupled to said processor 800. The device further includes an application and/or OS 808 and hard disk 810 coupled to the processor. It further includes the WLAN module 1500 and the projecting module 1000.

Figure 9:
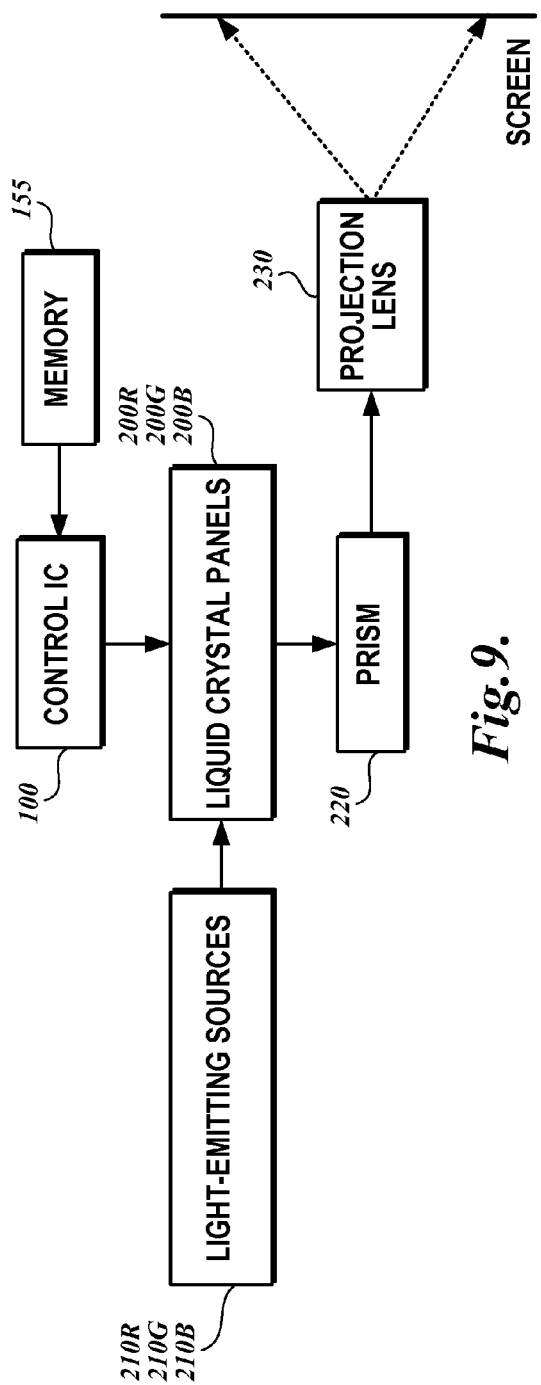
FIGS. 9 and 10 show a diagram of a projector module according to the present disclosure.
Figure 10:
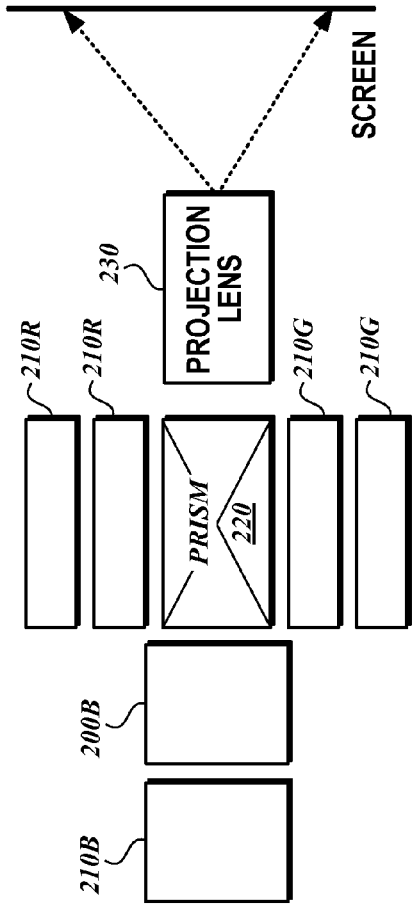

Moreover, another projection module for the portable terminal according to the present disclosure is shown in FIG. 9. A projection display module 1000 is coupled to the control IC 100. One type of such a projection display module is the liquid crystal projector wherein images on a liquid crystal panel are enlarged and projected by a projection lens onto a reflective screen and thus displayed. The liquid crystal projection display module comprises a light source lamp unit inside a shell of the device. Electrical discharge lamps such as metal halide lamps, or halogen lamps, could be used in the light source lamp unit. The light emitted from this light source lamp unit is guided via a mirror to dichroic minors, whereby it is separated into red light, green light, and blue light. The images displayed on the three liquid crystal panels, respectively, are illuminated by their respective colors, and this light is combined by a prism. In one embodiment (see FIG. 10), the liquid crystal projector comprises three liquid crystal panels 200R, 200G, and 200B that perform image displays in red, green, and blue, respectively. The panel-form light-emitting sources 210R, 210G, and 210B are employed and positioned in correspondence with the liquid crystal panels, respectively. In one embodiment, the light-emitting sources 210R, 210G, and 210B are organic EL (electroluminescence) elements. These organic EL elements are electric-field light-emitting thin films that are capable of emission of red, green, and blue light. The EL elements are formed behind and adjacent to the liquid crystal panels 200R, 200G, and 200B, respectively. The liquid crystal panels 200R, 200G, and 200B and the light sources 210R, 210G, and 210B are positioned on the light-incidence side of the side surfaces of the prism 220 for each display color combination. The projection lens 230 could be made up of a plurality of lenses. Thus, the data or file stored in the memory 155 of the device can be projected on a screen or wall. It allows the user to project an image, game, or file on an external screen. The EL element is small, flat form, and lightweight; therefore, it allows a small projector to be integrated in the portable device. The illumination sources could be LED, laser diode, FED, or the like.

Figure 11:
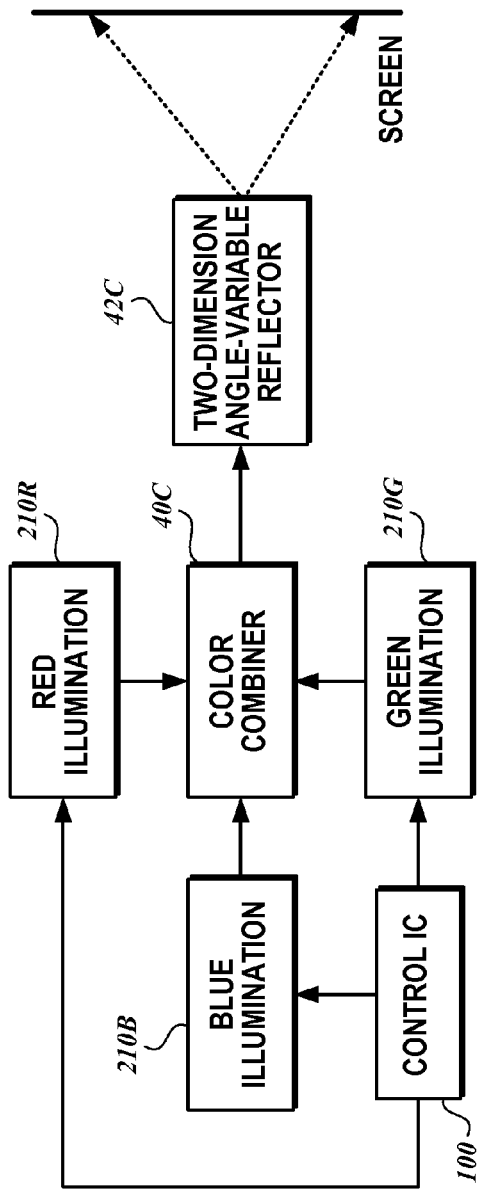
FIGS. 11-13 show a diagram of another projector module according to the present disclosure.

An embodiment is now described with reference to FIG. 11. Pluralities of illuminations 210R, 210G, 210B are coupled to the control IC 100. The control IC will send an image control signal to the pluralities of illuminations 210R, 210G, 210B, respectively. The pluralities of illuminations 210R, 210G, 210B are all independent light sources, such as LED, OLED, or laser. The images will be enlarged and projected by a two-dimension reflector onto a reflective screen and thus displayed. A color combiner (or illuminator combiner) 40C will receive the illumination from each of the pluralities of illuminations 210R, 210G, 210B, thereby constructing a demanded color which is determined by the control IC 100. The color combiner (or illuminator combiner) 40C can mix any color via the R, G, B illumination sources at any timing controlled by the control IC 100. A two-dimension, angle-variable reflector 42C is coupled to the color combiner (or illuminator combiner) 40C to reflect the combined illumination to a pre-determined location on the screen. The two-dimension, angle-variable reflector 42C may change the angle between the normal line of the screen and the reflected beam. Preferably, the two-dimension reflector 42C is made by thin membrane which can reflect illumination along the X and Y axis to show the image pixel-by-pixel. It can be made by digital minor technology or micro-electromechanical systems. The illuminations include a laser, LED, or OLED to emit a laser beam to the two-dimension reflector for horizontally moving the laser beam at a first sweep frequency along X-axis, and vertically moving the laser beam up or down along Y-axis. The control IC is operative for controlling the two-dimension reflector to ensure the pixel of the image can be reflected to a demanded location. A driver of the two-dimension reflector drives the angle of the two-dimension reflector. The driver horizontally sweeps X-direction to form a horizontal scan line from one point, then the drive adjusts the angle to move the scan line to the next vertical position, followed by sweeping another X-direction to form a second horizontal scan line along the X-direction to form a second scan line. The formation of successive scan lines proceeds in the same manner. The whole image can be scanned by one two-dimension reflector and can be made by digital mirror technology or micro-electromechanical systems. The projection image can be displayed by the two-dimension reflector.

Figure 12:
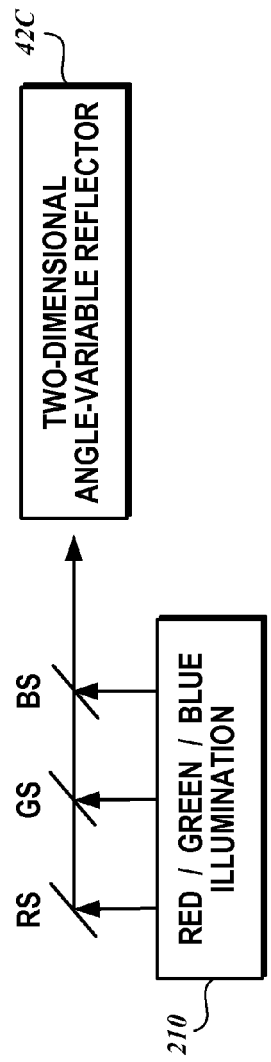
Figure 13:
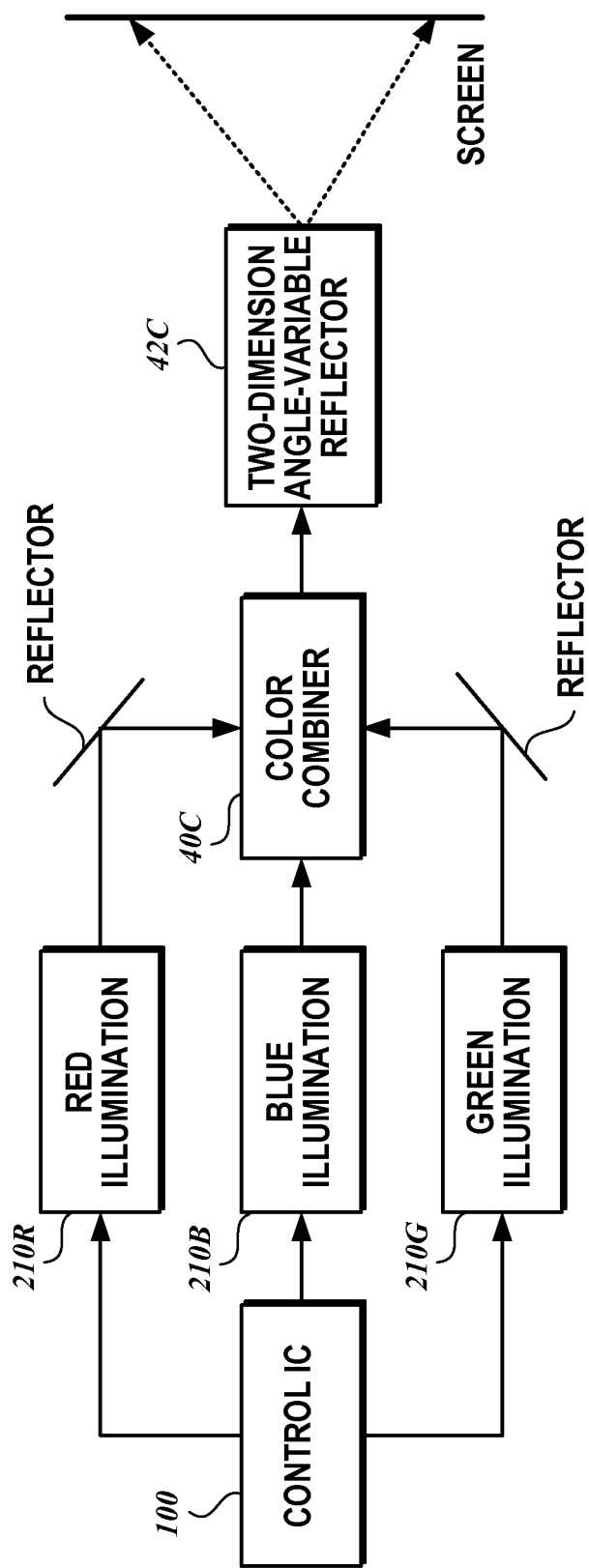

Light-emitting sources 210R, 210G, and 210B are employed and positioned in correspondence with the color combiner 40C, respectively. In one embodiment, the light-emitting sources 210R, 210G, and 210B are organic EL (electroluminescence) elements, LED, or laser. These organic EL elements are electric-field light-emitting thin films that are capable of emission of red, green, and blue light. The EL elements are formed adjacent to the color combiner 40C, respectively. The light sources 210R, 210G, and 210B are positioned on the three sides of the color combiner 40C for each display color combination. Thus, the data or file stored in the memory of the device can be projected on a screen or wall. It allows the user to project the image, game, or file on an external screen. The EL element is small, flat form, and lightweight; therefore, it allows the small projection to be integrated in the portable device. FIG. 12 shows the three mirrors RS, GS, BS are arranged in a line and illumination sources 210 are reflected by the lined reflected mirrors. The sources indicated in FIGS. 1A, 1B and 2-5 could be used. FIG. 13 shows that the light-emitting sources 210R, 210G, and 210B are reflected by a reflector into the color combiner 40C, and thereby projected by the two-dimension reflector 42C.

Figure 14:
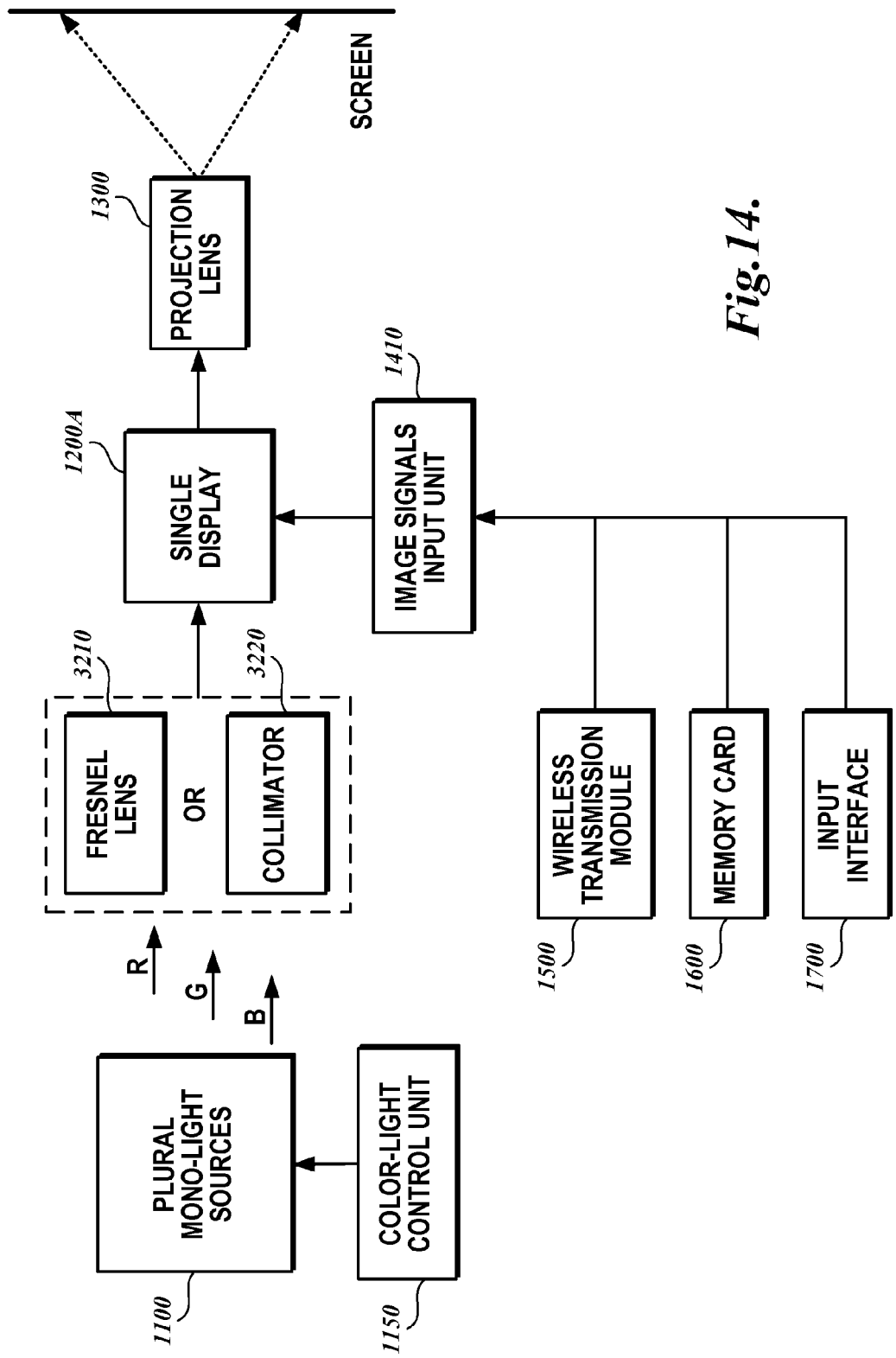

FIG. 14 illustrates the image projector with plural light sources and a single display, which comprises a color-light control unit 1150. In one embodiment, a single display 1200A is provided for displaying grayscale images, and those images can be magnified and projected on a screen or wall by the projection lens 1300. The aforementioned display 1200A may include LCD, organic light-emitting display, field emission display, etc. Multiple mono-light sources 1100 emit at least three kinds of mono-light for emitting blue, green, and red light, respectively, thereby facilitating to combine the color image. The image in single LCD can appear as grayscale, and it can be penetrated by the corresponding light, such as red, green, and blue light, which are emitted, respectively, and finally, the image penetrated by corresponding light can be magnified and projected by the projection lens 1300. The emitting order of the aforementioned three kinds of mono-light can be arranged randomly, such as BGR (blue, green, red), BRG, GRB, GBR, etc. Because three colors are emitted successively, people can see color images due to visual persistence phenomena. Luminous intensity and emitting time of every color from multiple mono-light sources 1100 can be controlled based on the color information by the color-light control unit 1150.

For improving luminous intensity and preventing the dark light issue, the multiple mono-light sources 1100 can further emit white light in addition to the aforementioned three colors, so as to enhance luminous intensity. The white light can be inserted in any of the aforementioned three colors. Images generated by the display 1200A are fed by the image signals input unit 1410. Because the present disclosure describes emitting at least three kinds of mono-light and sequentially projects a red image, a green image, and a blue image to the screen by a grayscale display, the color separation device is not required and the image has not split; therefore, the light beam splitter is no longer required. If LED, laser, or EL (electroluminescence) elements, etc., are chosen, the device can be not only reduced in size, but also achieve heat dissipation efficiency higher than the bulb.

Simply speaking, emitting order and luminous intensity of each independent mono-light can be controlled by the color-light control unit, thereby mixing the three independent images into a color image by visual persistence of human eyes based on the three color light beams emitted in sequence within the duration of the visual persistence. When mono-light passes through the display 1200A, the grayscale image on the display 1200A will become a mono-color image such as red, green, or blue image, and afterward, each mono-color image will be projected by the projection lens 1300, followed by being mixed into a color image due to the visual persistence of human eyes. Hence, the present disclosure describes employing plural mono-light sources which generate not much heat.

Further, the present disclosure introduces a single display. Three images with different colors can be generated at different times because each mono-light emits through the single display in succession. Then, those images can be projected on the screen by the projection lens, independently. Therefore, an advantage of the present disclosure is that a plurality of displays are not required, thereby reducing the cost and simplifying the structure. Furthermore, a light beam splitter for splitting light is no longer required, and the prism for combining split light is not needed either. Consequently, the present disclosure simplifies the optical structure significantly. Moreover, a color separation device for separating colors of a frame is also not required. In a preferred embodiment, the display 1200A comprises LCD for rendering grayscale images. When grayscale images are employed, the LCD does not need any color filter. Because color filters shade light greatly, which can make luminosity insufficient, if the color filters can be eliminated, it may be helpful for minimizing the structure, improving luminosity, and reducing power consumption.

The aforementioned emitting light source can employ organic light-emitting elements, which emits red, green, and blue light. The projection lens 1300 is configured at the side of the display, and a screen can be placed at a proper position for receiving the projected images. Thus, data, files, or games stored in the communication device, the media player, or the computer memory can be magnified and projected to an external display. Because the present disclosure utilizes thin and small elements such as organic light-emitting elements, light emission elements, laser elements, etc., it can be integrated in a cell phone, digital camera, digital image recorder, or GPS device. The wireless transmission module 1500 can receive images from external sources, and the images or signals desired to be projected can be input by the image signal input unit 1410. Images or signals desired to be projected can also be input through a memory card or a flash drive 1600, such that inconvenience raised by carrying the computer can be alleviated. Those images or signals can also be input through the input interface 1700, such as in a cell phone with USB, or HDMI, thereby projecting images or information in the cell phone.

Figure 15:
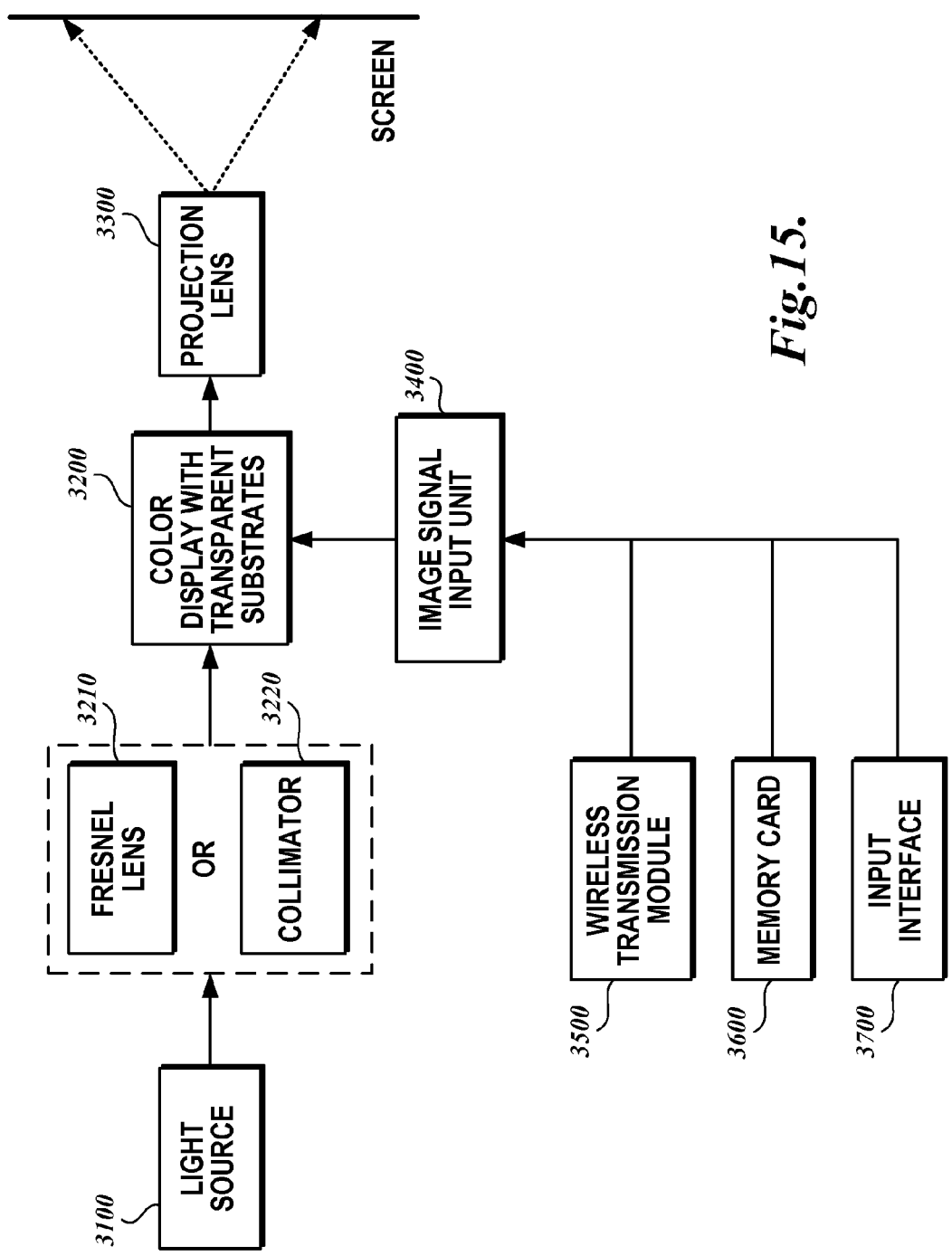

FIG. 15 illustrates an image projector of the present disclosure, which comprises a color display with transparent substrates 3200 for rendering color images. A previously described embodiment displays grayscale images, and is quite different from the present embodiment. The color images can be enlarged and projected on a screen or wall. The aforementioned display 3200 may include LCD, organic light-emitting device, field emission display, etc. The mono-light source 3100 emits white color. The images on the single LCD in the first embodiment is grayscale, followed by being penetrated, respectively, by three kinds of corresponding mono-light, such as red, green, and blue light. The embodiment employs white light to penetrate the color display, and images will be magnified and projected. Images on the display 3200 are fed by image signal input unit 3400. If plasma display, field emission display, or organic light-emitting display is introduced, fluorescence powders can be employed to appear grayscale or color to take place of color filters, thereby raising luminosity.

Therefore, an advantage of the present disclosure is not requiring a plurality of RGB respective displays, thereby simplifying the circuit structure. Further, the present disclosure does not require a light beam splitter for splitting light from a light source, and further, does not require any prism for combining split light. Thus, the present disclosure can simplify the optical structure significantly. Moreover, the color separation device for separating colors of a frame is also not required.

If the light source 3100 is a planar mono-light source (such as field emitter, organic light-emitting element, etc.), parallel light can be provided to the display 3200, thereby alleviating non-uniformity of light. Other components in the figure are similar to FIG. 14 and FIG. 15, so they are not described redundantly here. Because color filters will shade light considerably, the grayscale image display collocated with three independent light sources are preferred for sequentially generating red, green, blue images, followed by generating color images by the visual persistence of the human eyes. In another embodiment, color filters are not introduced and images can be rendered by fluorescent material, so that simplifying the structure and decreasing opacity, and thus, a mono-light source can be used, so as to generate light penetrating through the color display directly. Choices of the aforementioned elements can be determined based on cost, resolution, or luminosity, etc.

Referring to FIG. 16, if the aforementioned planar light source is not employed, a Fresnel lens 3210 can be configured adjacent to the light source 3100. The light source 3100 is positioned at the focal point, a parallel light beam will be generated and will penetrate the lens. In the meantime, the Fresnel lens 3210 can reduce the thickness for minimizing the device. The Fresnel lens can be regarded as a series of prisms arranged circularly, wherein the edge is sharper and the center is smoother. The configuration of the Fresnel lens allows reducing the thickness, weight, and size dramatically. Besides, the Fresnel lens configured in front of the light source can be applied in the aforementioned embodiments, such as the embodiments of FIG. 14, or FIG. 15, and is not limited to the current embodiment. A collimator 3220 can also be introduced to replace the aforementioned Fresnel lens or to cooperate with the Fresnel lens for facilitating to generate parallel light, such as shown in FIG. 16B. The collimator 3220 comprises a curved lens, and the light source is positioned at the focal point of the curved lens. The surface of the collimator 3220 that faces the light source has a higher curvature, and the other surface not facing the light source has a lower curvature. The collimator 3220 can also check whether other optical components are located on the optical axis, and hence, it can not only make light parallel, but also can be used for correction. The collimator 3220 configured in front of the light source can further be applied in the aforementioned embodiments, and is not limited to the present embodiment. The aforementioned Fresnel lens may also be configured between the display and the projection lens, wherein the projection lens is positioned at the focal lens. In another embodiment, apart from the aforementioned features, if the self-luminous color display, such as an OLED, field emission display, or EL display, is employed, the light source can be omitted since the fluorescence layer therein can illuminate when providing current. If the luminosity is in the acceptable range, the light source can be retrenched, thereby further achieving the advantage of minimizing Compared to the LCD, the advantages include: thickness thinner than 1 mm and lighter weight; and solid structure with vibration resistance better than liquid. Moreover, it is advantageous that the structure has almost no issues about the viewing angle, so that the images are not distorted while being watched in a wide viewing angle. For example, AMOLED (Active Matrix/Organic Light-Emitting Diode) can be employed, because it allows higher speed, higher contrast ratio, wider viewing angle; does not require any backlight plate; can be manufactured in a thinner configuration; and can save more power. The AMOLED without the back light plate can save about 30-40% of the cost of the backlight module in TFT LCD, referred to FIG. 16D. A Fresnel lens or collimator 3230 is configured between the projection lens 3300 and the self-luminous display 3200, and the aforementioned projection lens is positioned at the focal point of the Fresnel lens or the collimator 3230. A reflector can be configured at the backside of the light source in each embodiment mentioned above depending on demands, so as to reflect light to the display. The aforementioned collimators can be replaced by the light grating, so as to provide uniform light. Such means can be used for above and later embodiments to achieve the purpose of evening the illuminations.

FIG. 13B includes a color control module 1400 to control the emission of R, G, and B light sources to penetrate through the PBS in sequence and the PBS will re-direct the light into the LCOS (Liquid Crystal on Silicon) panel 1200B without color filter. Then, the lights are respectively reflected from the silicon substrate in sequence, followed by penetrating the PBS toward to the projection lens. Referring to FIG. 13A, the three illumination sources, namely, R, G, and B are arranged at three sides of the prism, the prism re-directs the R, G, and B to the projection lens. It is not used for the color combination in the embodiment. The distances from each one of the three light sources to the projection lens are equal to offer the same optical path. A grayscale display is provided, and the R, G, and B lights pass the prism and the projection lens in sequence. The color image will be a combination due to the persistence phenomena of eyes. The light sources can be the same as the previous embodiment. The three-side arrangement may integrate and scale down the devices. Further, the present disclosure may control the R, B, G independently to achieve desired contrast and color combination. In FIG. 13B, the light sources are arranged at the same side to the PBS. The light sources are arranged in matrix form as shown in FIG. 13C. The matrix of FIG. 13C shows R, G, B light sources that are configured in alternating and repeating patterns. The column and row number can be changed if desired. Other features are already partially described in the above embodiments.

As will be understood by persons skilled in the art, the foregoing is illustrative of the present disclosure rather than limiting the present disclosure. Modification will now suggest itself to those skilled in the art. Thus, the disclosure is not to be limited to this embodiment, but rather the disclosure is intended to cover various modifications and similar arrangements included within the spirit and scope of the appended claims, the scope of which should be accorded the broadest interpretation so as to encompass all such modifications and similar structures. It will be appreciated that various changes can be made therein without departing from the spirit and scope of the disclosure.

I claim:

1. A portable image-capturing, two-way communication device comprising:
    a control integrated circuit;
    a wireless communication module coupled to the control integrated circuit and configured for two-way wireless communication with one or more other two-way communication devices;
    an image-capturing module coupled to said control integrated circuit;
    a memory coupled to said control integrated circuit; and
    a projection module coupled to said control integrated circuit, wherein said projection module is configured to project an image stored in said memory or in an external device outside said portable image-capturing device, wherein said projection module comprises:
    a light source unit;
    a reflective-type device coupled to said control integrated circuit, said reflective-type device configured to reflect red, green, and blue light emitted from said light source unit to a screen; and
    a color combiner coupled to said light source unit, said color combiner configured to combine red, green, and blue light emitted from said light source unit,
    wherein said light source unit comprises red, green, and blue light sources at one side of said color combiner, and wherein said reflective-type device comprises three reflector mirrors arranged in line to reflect said red, green, and blue light from said light source unit, respectively.

2. The portable image-capturing, two-way communication device of claim 1, wherein said light source unit comprises a plurality of elements configured to emit red, green, or blue light, the plurality of elements selected from the group consisting of an OLED element, an LED element, a laser diode, an electroluminescence element, and a field-emitting element.

3. The portable image-capturing, two-way communication device of claim 1, wherein said light source unit comprises red, green, and blue light sources adjacent to said color combiner.

4. The portable image-capturing, two-way communication device of claim 1, wherein said projection module further comprises a color control module coupled to said light source unit, wherein said color control module is configured to switch said light source unit to emit red, green, and blue light in sequence.

5. The portable image-capturing, two-way communication device of claim 1, wherein said projection module further comprises a projection lens.

* * * * *